United States Patent
Byers

(10) Patent No.: US 9,532,086 B2
(45) Date of Patent: Dec. 27, 2016

(54) SYSTEM AND METHOD FOR PRODUCT PLACEMENT AMPLIFICATION

(71) Applicant: AT&T Intellectual Property I, LP, Atlanta, GA (US)

(72) Inventor: Simon D. Byers, Summit, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 79 days.

(21) Appl. No.: 14/085,419

(22) Filed: Nov. 20, 2013

(65) Prior Publication Data

US 2015/0143410 A1 May 21, 2015

(51) Int. Cl.
*H04N 21/234* (2011.01)
*H04N 21/81* (2011.01)
(Continued)

(52) U.S. Cl.
CPC ...... *H04N 21/23424* (2013.01); *H04N 21/812* (2013.01); *G06Q 30/0273* (2013.01); *H04N 21/23418* (2013.01); *H04N 21/26225* (2013.01)

(58) Field of Classification Search
CPC .............. H04N 21/25435; H04N 21/2547; H04N 21/812; H04N 21/23418; H04N 21/23424; H04N 21/2543; H04N 21/262; H04N 21/26225; G06Q 30/02; G06Q 30/0273
See application file for complete search history.

(56) References Cited

U.S. PATENT DOCUMENTS 6,820,277 B1 * 11/2004 Eldering et al. ................ 725/35
8,180,667 B1 * 5/2012 Baluja et al. ............... 705/14.19
(Continued)

FOREIGN PATENT DOCUMENTS

EP 0805405 4/1998
EP 2174500 A2 4/2010
(Continued)

OTHER PUBLICATIONS

Faloutsos, C. et al., "Efficient and Effective Querying by Image Content", IBM Research Division, Almaden Research Center, 1994.
(Continued)

*Primary Examiner* — Justin Shepard
*Assistant Examiner* — Alexander Boyd
(74) *Attorney, Agent, or Firm* — Guntin & Gust, PLC; Jay H. Anderson

(57) ABSTRACT

A system that incorporates the subject disclosure may include, for example, a memory that stores executable instructions that, when executed by the processor, facilitate performance of operations. The operations comprise obtaining product image data and comparing image data of a media program with the product image data. A product placement in the media program is determined based on the comparison, and an entry in a product placement database is generated. The entry comprises identifiers of the media program, a product descriptor descriptive of the product, and a context descriptor descriptive of a presentation scheme used for the first product placement. A rating is assigned to the media program with respect to the product in accordance with the entry of the product placement in the product placement database and other entries of other product placements in the product placement database. Other embodiments are disclosed.

20 Claims, 9 Drawing Sheets

(51) Int. Cl.
*G06Q 30/02* (2012.01)
*H04N 21/262* (2011.01)

(56) References Cited

U.S. PATENT DOCUMENTS

| | | |
|---|---|---|
| 8,280,195 B2 | 10/2012 | Nakajima |
| 8,312,486 B1 | 11/2012 | Briggs et al. |
| 8,321,896 B2 | 11/2012 | Macrae et al. |
| RE43,896 E | 1/2013 | Keaton et al. |
| 8,359,611 B2 | 1/2013 | Johnson et al. |
| 8,429,005 B2 | 4/2013 | Mannik et al. |
| 8,521,779 B2 | 8/2013 | Hodgkinson et al. |
| 8,522,289 B2 | 8/2013 | Athsani et al. |
| 2002/0075332 A1 | 6/2002 | Geilfuss, Jr. et al. |
| 2005/0229227 A1 | 10/2005 | Rogers |
| 2005/0267879 A1 | 12/2005 | Sekiguchi et al. |
| 2006/0111968 A1* | 5/2006 | Cline et al. ............... 705/14 |
| 2006/0190329 A1 | 8/2006 | Green et al. |
| 2006/0294538 A1* | 12/2006 | Li ................. H04N 21/23424 725/24 |
| 2007/0003223 A1 | 1/2007 | Armstrong et al. |
| 2007/0237426 A1 | 10/2007 | Xie et al. |
| 2008/0065508 A1* | 3/2008 | Watt ............... G06F 17/30864 705/26.1 |
| 2008/0219504 A1* | 9/2008 | Adams et al. ............. 382/103 |
| 2008/0250445 A1* | 10/2008 | Zigmond ............ G06Q 30/02 725/32 |
| 2008/0263583 A1* | 10/2008 | Heath ................. G06Q 30/02 725/32 |
| 2011/0078003 A1* | 3/2011 | Steelberg ............ G06Q 30/02 705/14.4 |
| 2011/0137753 A1* | 6/2011 | Moehrle ..................... 725/60 |
| 2013/0212477 A1 | 8/2013 | Averbuch |
| 2014/0082648 A1* | 3/2014 | Tanner et al. ............... 725/14 |
| 2014/0250457 A1* | 9/2014 | Ramaswamy ....... H04N 21/812 725/34 |
| 2015/0050010 A1* | 2/2015 | Lakhani et al. ............ 386/285 |
| 2015/0213486 A1* | 7/2015 | Shenk ............. G06Q 30/0246 705/14.45 |

FOREIGN PATENT DOCUMENTS

| | | |
|---|---|---|
| EP | 2287798 A2 | 2/2011 |
| EP | 2630594 A1 | 8/2013 |
| WO | 9613124 | 5/1996 |
| WO | 03012693 | 2/2003 |
| WO | 2005004159 A1 | 1/2005 |
| WO | 2007051273 A2 | 5/2007 |
| WO | 2008094359 A1 | 8/2008 |
| WO | 2009065139 A1 | 5/2009 |
| WO | 2008149367 A3 | 2/2010 |

OTHER PUBLICATIONS

Flickner, Myron et al., "Query by Image and Video Content: The QBIC System", IBM Almaden Research Center, IEEE, 1995.

Smith, John R. et al., "VisualSEEk: a fully automated content-based image query system", ACM Multimedia, 1996.

* cited by examiner

200

500

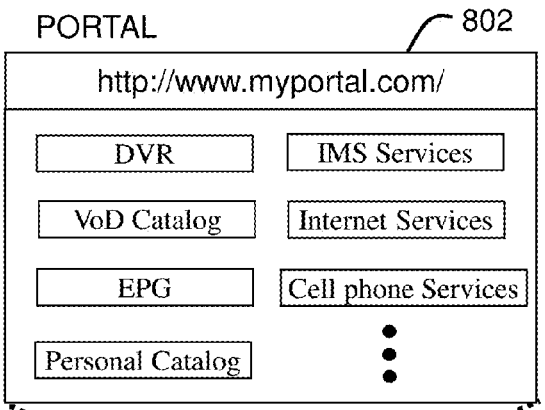
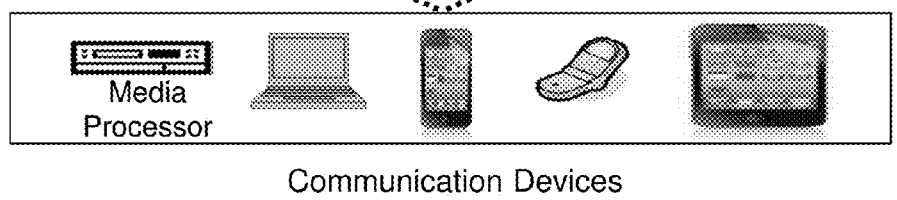
FIG. 8
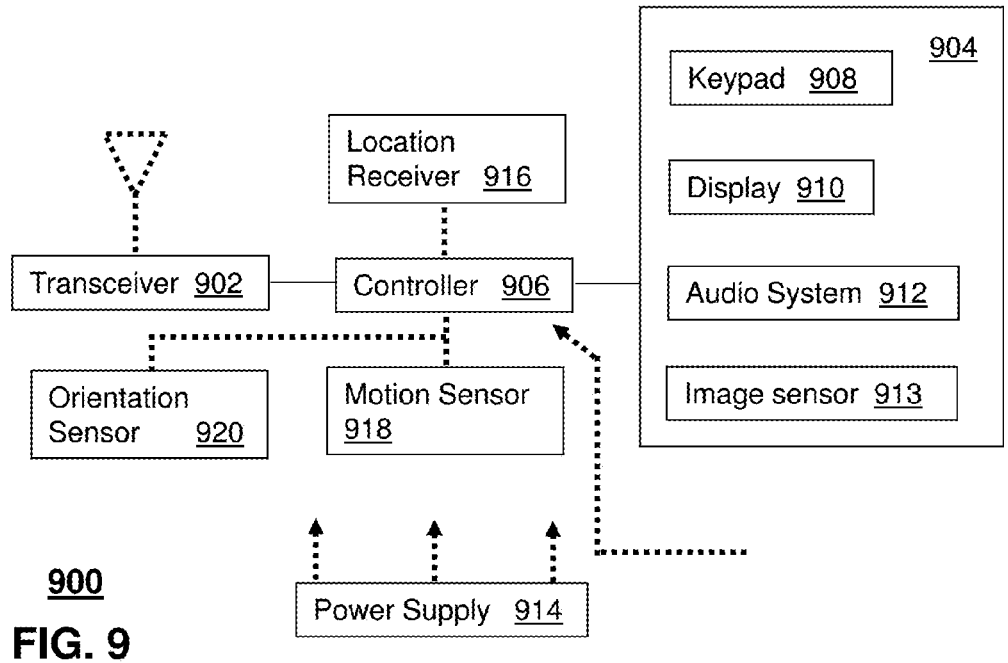
FIG. 9

SYSTEM AND METHOD FOR PRODUCT PLACEMENT AMPLIFICATION

FIELD OF THE DISCLOSURE

The subject disclosure relates to advertising and media analysis, and more particularly to a system and method for enhancing the value of product placement in advertising.

BACKGROUND

Product placement is a valuable form of advertising for both current and legacy media programs. In the case of legacy programs, a product placement may have happened many years in the past but can still be valuable.

BRIEF DESCRIPTION OF THE DRAWINGS

Reference will now be made to the accompanying drawings, which are not necessarily drawn to scale, and wherein:

FIG. 8 depicts an illustrative embodiment of a web portal for interacting with the communication systems of FIGS. 6 and 7;

FIG. 9 depicts an illustrative embodiment of a communication device; and

DETAILED DESCRIPTION

Figure 1:
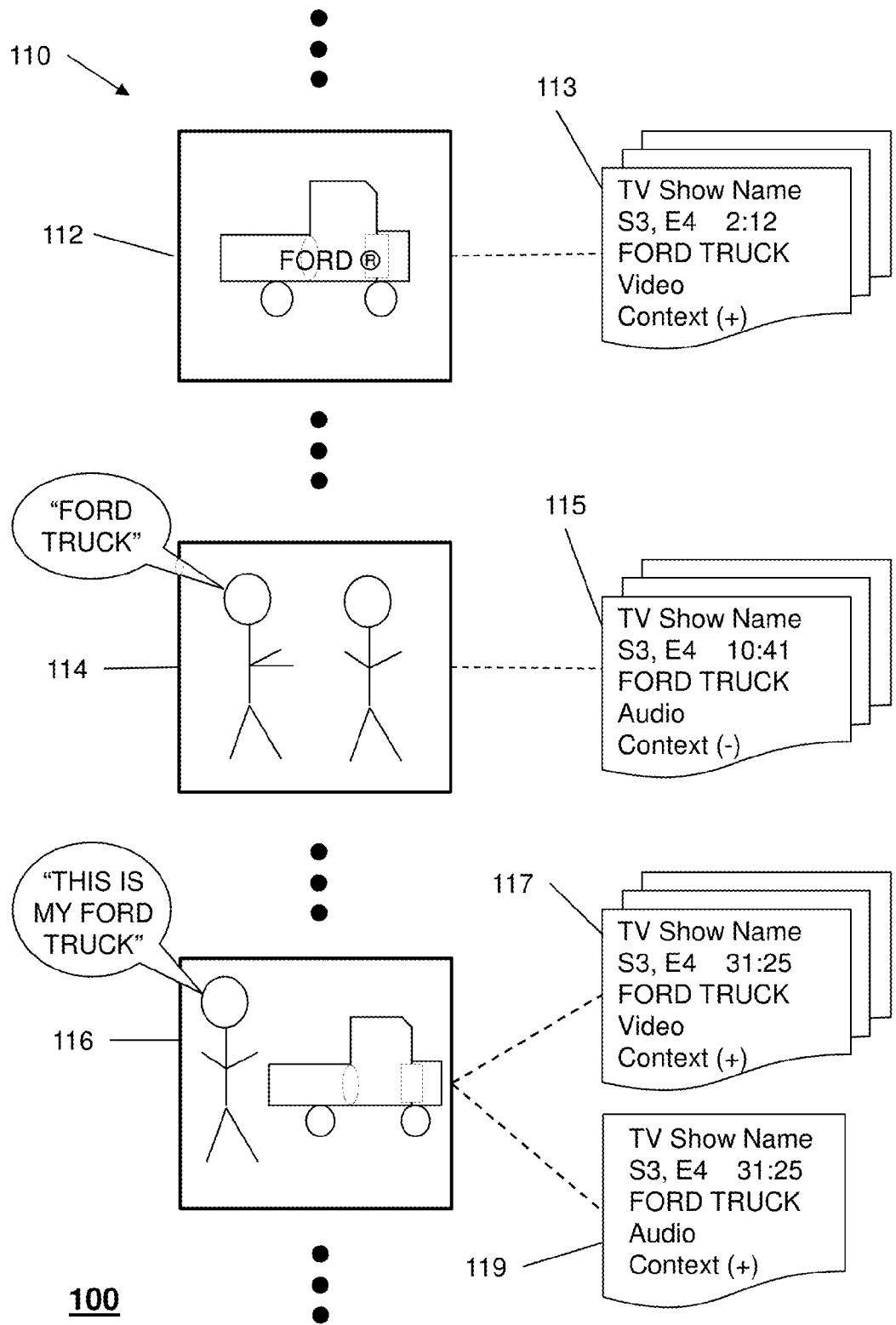
FIG. 1 schematically illustrates frames of a program having video and audio components with corresponding product placement database entries, in accordance with embodiments of the disclosure.

The subject disclosure describes, among other things, illustrative embodiments of systems and methods for constructing a product placement database and generating advertising value according to the product placements. Other embodiments are included in the subject disclosure.

One embodiment of the subject disclosure includes a method comprising retrieving, by a system comprising a processor, product image data from a product database, and comparing, by the system, video image data of a video frame with the product image data, wherein the video frame represents a portion of a program comprising video content. The method also comprises determining, by the system, a first product placement of a first product in the video frame based on the comparing of the video image data, and generating, by the system, a first entry in a product placement database based on the first product placement in the video frame, wherein the entry comprises an identifier of the program, an identifier of the video frame, a product descriptor descriptive of the first product, and a context descriptor descriptive of a presentation scheme used for the first product placement. The method further comprises assigning, by the system, a rating to the program with respect to the product in accordance with the first entry of the first product placement in the product placement database and other entries of other product placements in the product placement database, and generating, by the system, an advertising value associated with the program and the first product based on the rating.

One embodiment of the subject disclosure includes a system comprising a processor and a memory that stores executable instructions that, when executed by the processor, facilitate performance of operations. The operations comprise obtaining product image data and comparing video image data of a video frame with the product image data, wherein the video frame represents a portion of a program comprising video content. The operations also comprise determining a first product placement of a first product in the video frame based on the comparing of the video image data, and generating a first entry in a product placement database based on the first product placement in the video frame, wherein the entry comprises an identifier of the program, an identifier of the video frame, a product descriptor descriptive of the first product, and a context descriptor descriptive of a presentation scheme used for the first product placement. The operations further comprise assigning a rating to the program with respect to the product in accordance with the first entry of the first product placement in the product placement database and other entries of other product placements in the product placement database.

One embodiment of the subject disclosure includes a non-transitory computer-readable storage device comprising executable instructions which, when executed by a processor of a server, cause the processor to perform operations. The operations comprise obtaining product image data and comparing image data of a media program with the product image data. The operations also comprise determining a first product placement of a first product in the media program based on the comparison. The operations further comprise generating a first entry in a product placement database based on the first product placement in the media program, wherein the entry comprises an identifier of the media program, a product descriptor descriptive of the first product, and a context descriptor descriptive of a presentation scheme used for the first product placement.

According to an embodiment of the disclosure, a database is constructed to index events in a program of audio/video content. An event may be defined as an occurrence of a product in a program. FIG. 1 schematically illustrates an arrangement 100 of video frames with corresponding database entries. The program (in this example, an episode of a television series) has a stream 110 of video frames (with an audio component) that includes product placement events. In an embodiment, an automated system examines each frame of the program to recognize a particular product (e.g. using video processing filters). In the example shown in FIG. 1, frame 112 has an image of a vehicle that the automated system recognizes as a Ford® truck. The system automatically generates a database entry 113 for that product placement event—in this case, a video placement event. In a subsequent frame 114, dialogue between two characters includes a mention of a Ford truck, but the product image is not present. The system automatically generates a database entry 115 for an audio placement event. In a subsequent frame 116, a character mentions a Ford truck while the image is present. In this embodiment, the system automatically generates two database entries 117, 119 relating to frame 116 for video and audio placement events respectively.

As shown in FIG. 1, a database entry (indexed event) can include a unique identifier of the piece of content, time codes for the appearance of the product, and descriptors of the precise nature of the product and the context in which the product appears. For example, database entry 113 includes the program descriptor (name of the show, season 3, episode 4), the timing of the frame (2 minutes and 12 seconds from the beginning of the episode), the product descriptor, the type of placement event (audio or video), and a description of the context of the placement. The context description may include a quality indication (in this example, positive or negative), as described in more detail below.

Figure 2:
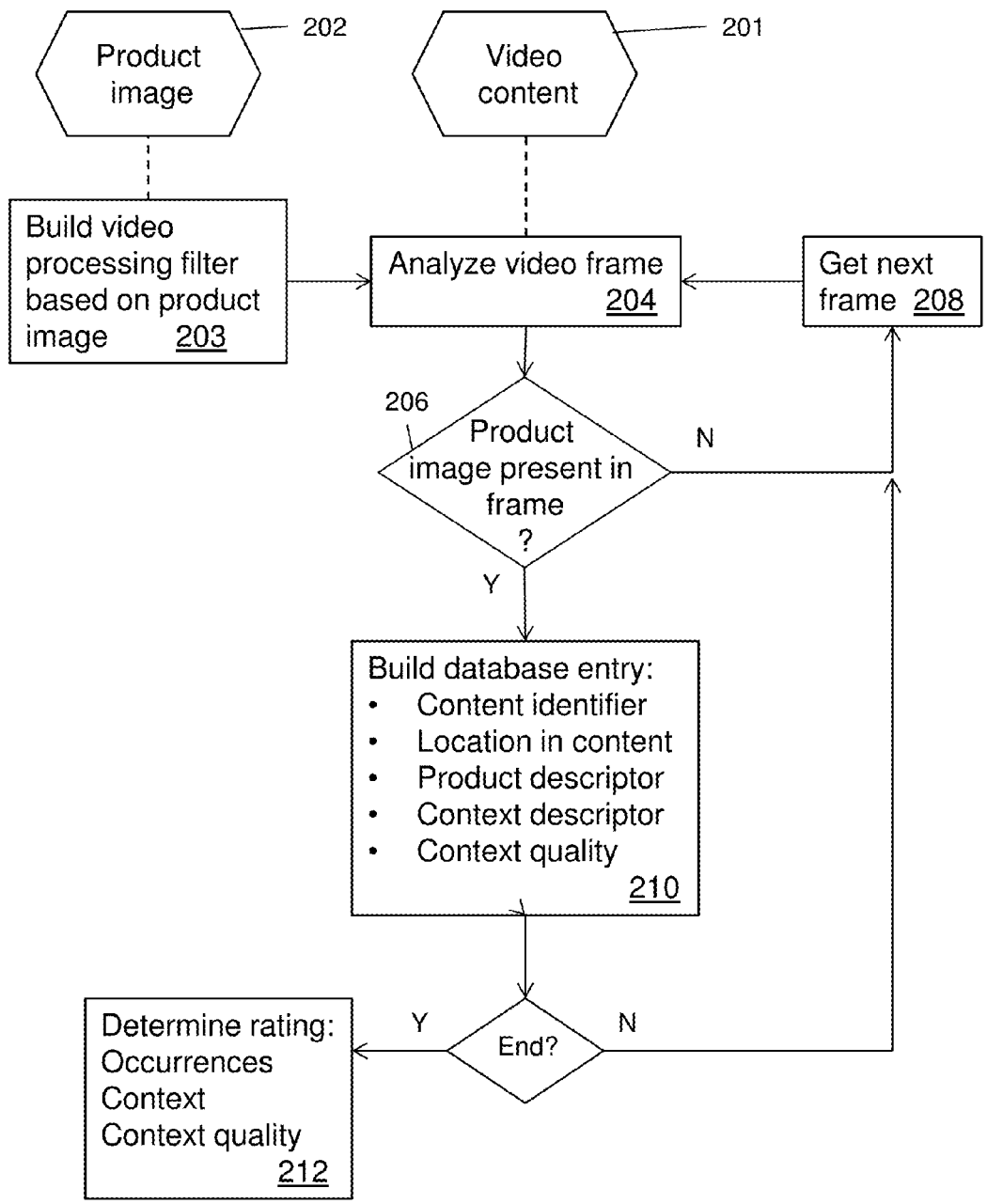
FIG. 2 is a flowchart illustrating a procedure for analysis of video frames to generate entries in a product placement database, in accordance with an embodiment of the disclosure.

FIG. 2 is a flowchart illustrating a procedure 200 for building a product placement database relating to video content 201. In this embodiment, procedure 200 is performed by an automated system. An image 202 of the product of interest is used to build a video processing filter (step 203). In general, a product can appear in a video program several different ways (e.g. foreground, background, front, side or rear view, partially obscured, etc.), so that a number of video processing filters can be applicable to a particular product.

In step 204, each segment of the video content (in this example, each frame of a legacy movie production) is analyzed using the video processing filter(s) for the product, to determine whether an image of the product is present in that frame; that is, whether a product placement event occurs in the frame. If so (step 206), a database entry is built for that event (step 210). As noted above, the entry includes an identifier for the content, and the location of the event (e.g. the video frame) in that content. The product is described at a level of detail consistent with the product image 202 and the associated video processing filter(s). For example, if the product is a Ford vehicle, and specifically a pickup truck, the product descriptor can be "Ford pickup truck" in a situation where the automated system reports Ford pickup trucks of all colors. If the video processing filter(s) are built so that the system reports only red trucks, the product descriptor can be "Ford pickup truck (red)."

The context can be described using categories that apply to the type of product in question. For example, the context descriptor for a vehicle can state whether the vehicle is standing still or in motion. In another example, the context descriptor for a beverage can state whether the beverage is being offered, or is actually consumed. The context quality indicates how prominently the product is shown and whether it is shown in a favorable or unfavorable light. In an embodiment, the context quality is given as positive, neutral or negative. For example, if the character in frame 116 comments favorably about the product, then the context quality in entry 117 is positive. If the dialogue in frame 114 includes a negative comment about the product, the context quality in entry 115 is negative. In another embodiment, the context quality can be assigned a numeric value according to predetermined criteria. For example, a frame showing a character consuming a beverage can have a higher positive context quality than a frame showing the character holding the beverage container in his hand.

Each succeeding frame of content is analyzed (step 208) for product placement events. After all frames of content have been analyzed, the system determines a rating for the video content 201 as it relates to the product (step 212). The rating typically will be based on the number of occurrences of product placement in the content, and can also be based on the context and context quality of those occurrences. The rating of the content will advantageously be expressed as a numeric value to permit comparing programs as to their suitability for advertising the product. If the video content is analyzed for placement of several products, the content will have a different rating for each product.

Figure 3:
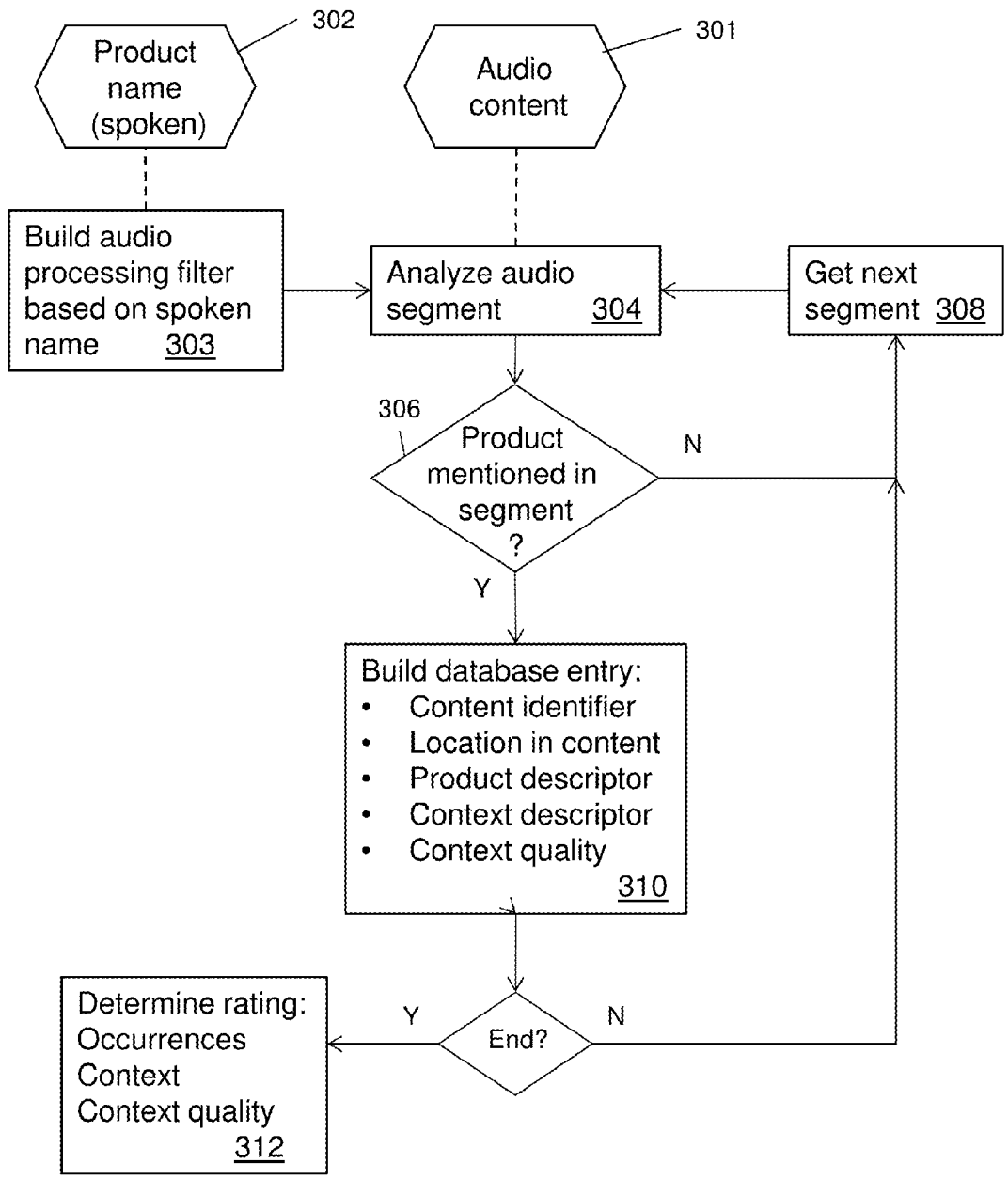
FIG. 3 is a flowchart illustrating a procedure for analysis of an audio component of a program to generate entries in a product placement database, in accordance with another embodiment of the disclosure.

FIG. 3 is a flowchart illustrating a procedure 300 for building a product placement database relating to audio content 301. In this embodiment, procedure 300 is performed by an automated system that also executes procedure 200. An audio recording 302 of a product name is used to build an audio processing filter (step 303). The product can be referred to in different ways (e.g. "Coca-Cola"® as well as "Coke"®), so that a number of audio processing filters can be applicable to a particular product.

In step 304, each segment of the audio content (in this example, the audio component of a movie having frames) is analyzed using the audio processing filter(s) for the product, to determine whether the product is mentioned in that segment; that is, whether a product placement event occurs in the audio segment. If so (step 306), a database entry is built for that event (step 310). As described above with reference to FIG. 2, the database entry includes an identifier for the audio content, the location of the event in the content, a description of the product, the context of the event and a context quality indication. As noted above with reference to FIG. 1, the context quality for an audio product placement event can be positive, neutral or negative without the product appearing in the corresponding video frame.

Each succeeding segment of content is analyzed (step 308) for product placement events. After all frames of content have been analyzed, the system determines a rating for the audio content 301 as it relates to the product (step 312). Similarly to procedure 200, the rating typically will be based on the number of occurrences of product placement in the content, and can also be based on the context and context quality of those occurrences.

In an embodiment, the ratings of a program determined from video content analysis 212 and audio content analysis 312 can be combined into an audio/video rating for the program. The combined rating can then be applied to the program content with respect to the product.

Figure 4:
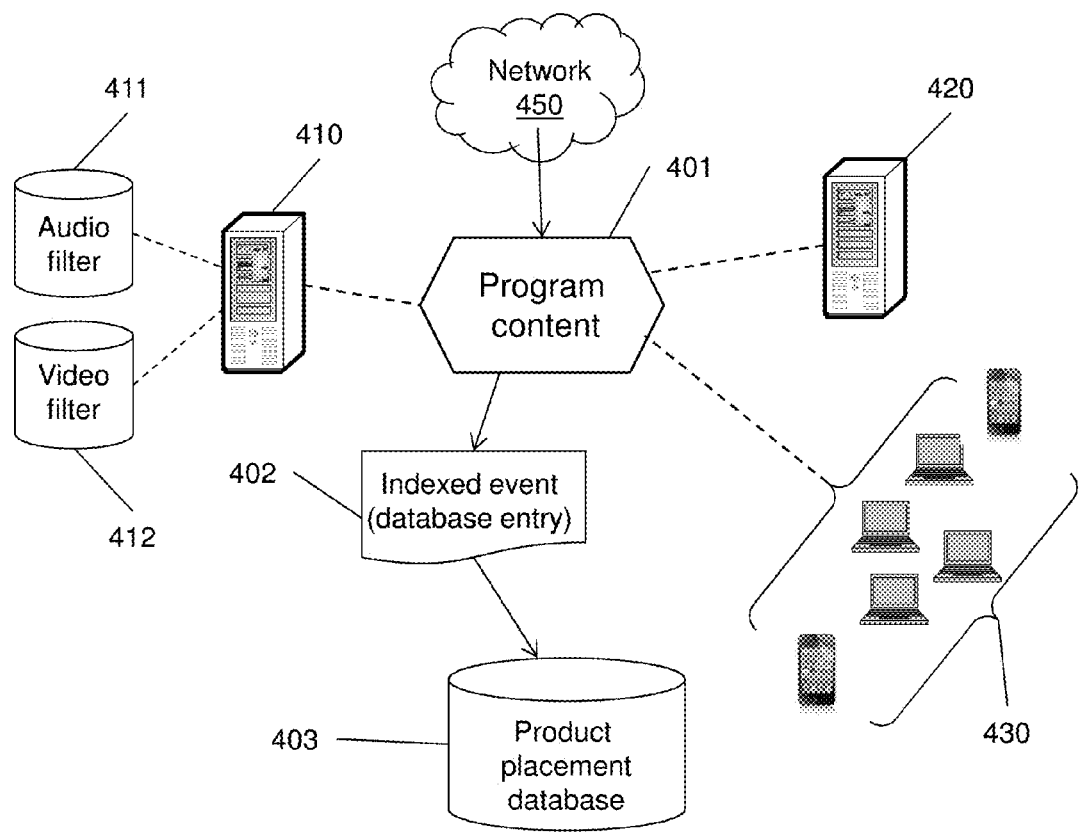
FIG. 4 schematically illustrates sourcing for product placement database entries, in accordance with an embodiment of the disclosure.

FIG. 4 is a schematic illustration 400 of sourcing for database entries regarding product placement events. In the example of FIG. 4, program content 401 is downloaded via network 450 and analyzed for product placement events. An event can be sourced in several ways. For example, an automated system executing on a computing device 410 can use audio and video processing filters 411, 412 to automatically identify the product from the dialogue in the program and from the images in the program, prepare an entry 402 for each event, and store the entries in database 403. In this example, the automated system analyzes the program content for placement of a variety of products, according to filters 411, 412. Alternatively, the content 401 can be analyzed by a computing device 420 of a product brand owner, so that the database has placement data for a specific brand.

In another embodiment, analysis of a video program and indexing of products can be crowd-sourced, where a number of user devices 430 function as a crowd-sourcing entity and perform crowd-sourced tagging of the program content. The users involved in crowd-sourcing may be given incentives by the brand owner. In a particular embodiment, the users in a crowd-sourcing entity participate in a project to analyze a legacy program for product placement events relating to products that are still marketed, years after the program was released.

Figure 5:
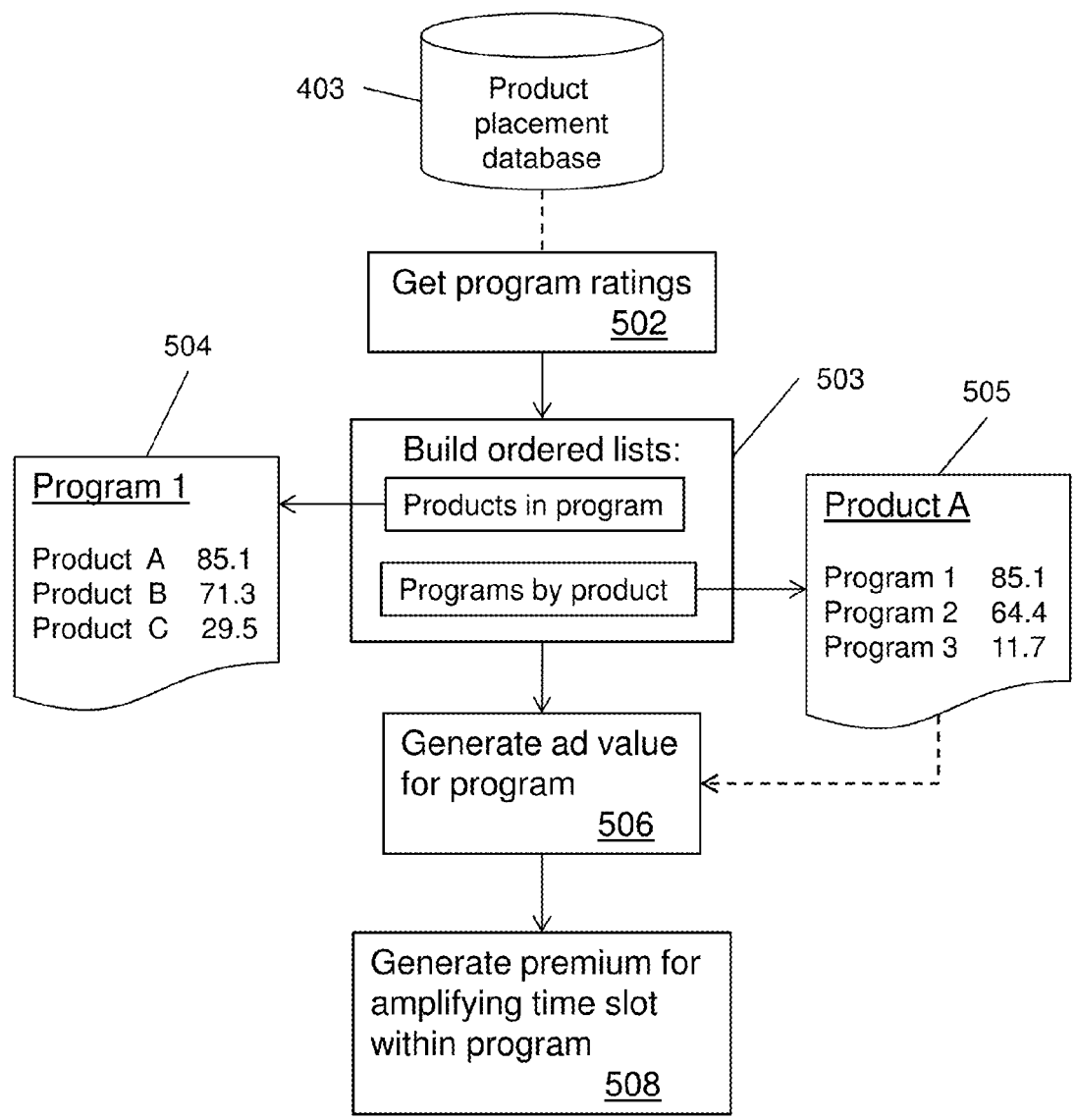
FIG. 5 is a flowchart illustrating generating an advertising value for a program using the product placement database.

FIG. 5 is a flowchart schematically illustrating a procedure 500 for generating an advertising value for a program using the product placement database 403. Procedure 500 can be performed by an automated system. In this embodiment, the system retrieves the ratings from the database (step 502) that relate placements of specific products to specific items of program content. In step 503, the system generates ordered lists based on the ratings. A list 504 can include all of the products found to be placed in a program (products A, B and C in program 1) with the ratings pertaining to each product. In this embodiment, the ratings are numeric values on a 0-100 scale. A list 505 can include all of the programs that have been analyzed for placement of a specific product (programs 1, 2 and 3 in which product placement of product A occurs) with the program ratings for that product.

An advertising value is generated for a program (step 506) that reflects the number of placement events, and positive context of those events, of a selected product. In general, the advertising value is based on the rating; a high rating indicates a relatively large number of placements of a given product with a favorable context (as shown in list 505). An advertiser of a product can have the influence of his ad enhanced by placing that ad in a presentation of a program with a high rating. This is referred to herein as product placement amplification of the ad. In particular, the advertiser for the product can be charged a premium price for an amplifying time slot within the program. In step 508, the database entries are examined for the locations of the most (or most favorable) placements of the product within the program; such locations in the program are the primary contributors to the program's rating. The system generates a premium price for time slots closest to those locations.

In another embodiment, a marketer of a program (e.g. program 1, as shown in FIG. 5) can use the ratings in list 504 to attract advertisers for that program. In this embodiment, the ratings in list 504 indicate the strength of product placement tie-ins appearing in the program.

In the embodiments described above, the indexed events indicate appearances of products that can be advertised. It will be appreciated that the program content can be analyzed for other types of events that can be indexed. Databases can be developed relating to various issues and situations appearing in programs, in addition to simple product placement. For example, an ad highlighting a certain social issue (e.g. privacy, gay rights, bullying) can be amplified when placed in a time slot in a program discussing that issue.

Figure 6:
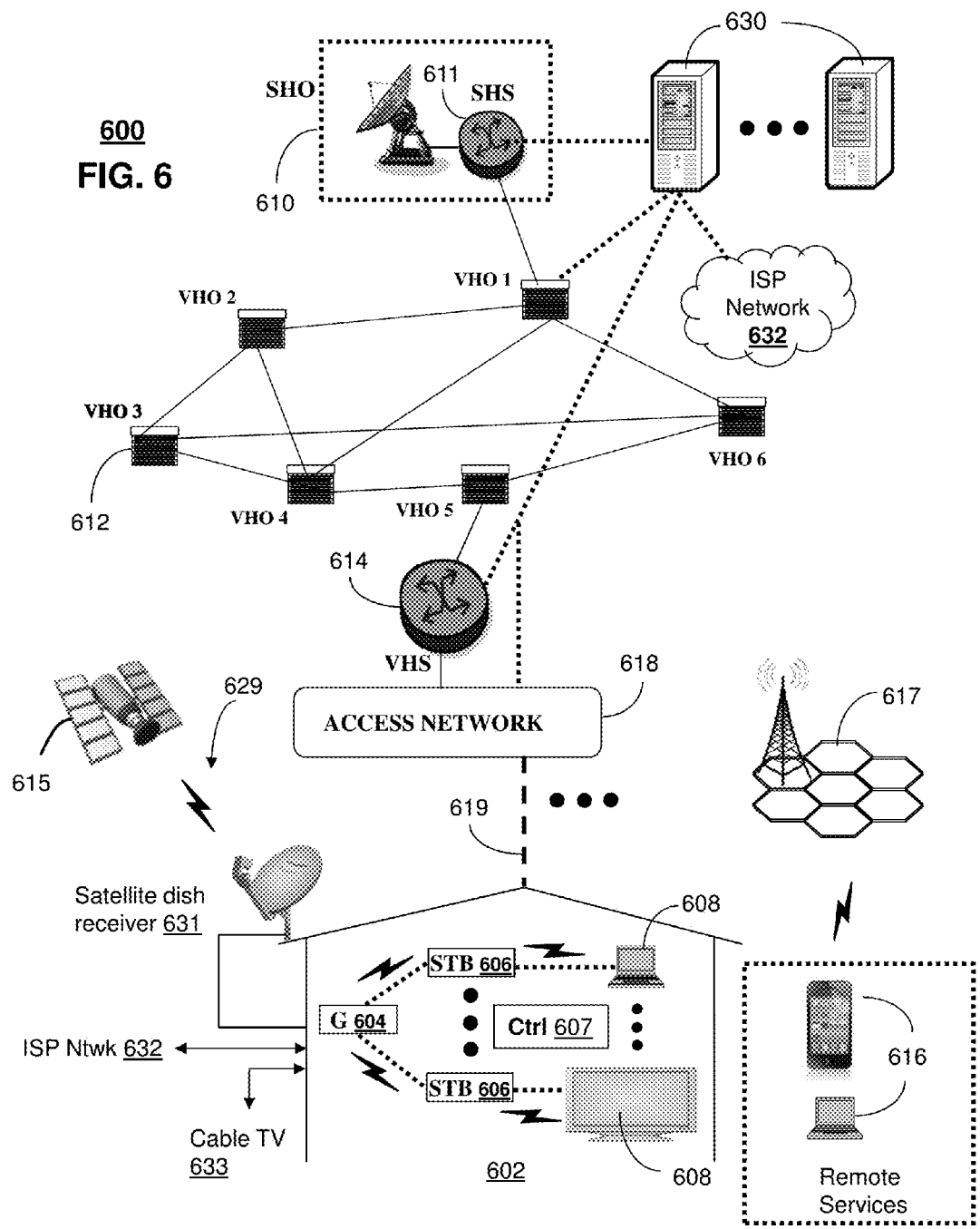
FIGS. 6-7 depict illustrative embodiments of communication systems that can be used in analyzing video and audio content to generate product placement database entries, in accordance with further embodiments of the disclosure.

FIG. 6 depicts an illustrative embodiment of a first communication system 600 for delivering media content, which can be analyzed and indexed using the systems and methods described above.

The communication system 600 can represent an Internet Protocol Television (IPTV) media system. Communication system 600 can be overlaid or operably coupled with an automated system(s) performing procedures 200, 300 and/or 500 as another representative embodiment of communication system 600. As detailed below, the system 600 comprises a processor and a memory that stores executable instructions that, when executed by the processor, facilitate performance of operations. The operations comprise obtaining product image data and comparing video image data of a video frame with the product image data, wherein the video frame represents a portion of a program comprising video content. The operations also comprise determining a first product placement of a first product in the video frame based on the comparing of the video image data, and generating a first entry in a product placement database based on the first product placement in the video frame, wherein the entry comprises an identifier of the program, an identifier of the video frame, a product descriptor descriptive of the product, and a context descriptor descriptive of a presentation scheme used for the first product placement. The operations further comprise assigning a rating to the program with respect to the product in accordance with the first entry of the first product placement in the product placement database and other entries of other product placements in the product placement database.

The IPTV media system can include a super head-end office (SHO) 610 with at least one super headend office server (SHS) 611 which receives media content from satellite and/or terrestrial communication systems. In the present context, media content can represent, for example, audio content, moving image content such as 2D or 3D videos, video games, virtual reality content, still image content, and combinations thereof. The SHS server 611 can forward packets associated with the media content to one or more video head-end servers (VHS) 614 via a network of video head-end offices (VHO) 612 according to a multicast communication protocol.

The VHS 614 can distribute multimedia broadcast content via an access network 618 to commercial and/or residential buildings 602 housing a gateway 604 (such as a residential or commercial gateway). The access network 618 can represent a group of digital subscriber line access multiplexers (DSLAMs) located in a central office or a service area interface that provide broadband services over fiber optical links or copper twisted pairs 619 to buildings 602. The gateway 604 can use communication technology to distribute broadcast signals to media processors 606 such as Set-Top Boxes (STBs) which in turn present broadcast channels to media devices 608 such as computers or television sets managed in some instances by a media controller 607 (such as an infrared or RF remote controller).

The gateway 604, the media processors 606, and media devices 608 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 606 and subsystems of the IPTV media system for services such as video-on-demand (VoD), browsing an electronic programming guide (EPG), or other infrastructure services.

A satellite broadcast television system 629 can be used in the media system of FIG. 6. The satellite broadcast television system can be overlaid, operably coupled with, or replace the IPTV system as another representative embodiment of communication system 600. In this embodiment, signals transmitted by a satellite 615 that include media content can be received by a satellite dish receiver 631 coupled to the building 602. Modulated signals received by the satellite dish receiver 631 can be transferred to the media processors 606 for demodulating, decoding, encoding, and/or distributing broadcast channels to the media devices 608. The media processors 606 can be equipped with a broadband port to an Internet Service Provider (ISP) network 632 to enable interactive services such as VoD and EPG as described above.

In yet another embodiment, an analog or digital cable broadcast distribution system such as cable TV system 633 can be overlaid, operably coupled with, or replace the IPTV system and/or the satellite TV system as another representative embodiment of communication system 600. In this embodiment, the cable TV system 633 can also provide Internet, telephony, and interactive media services.

The subject disclosure can apply to other present or next generation over-the-air and/or landline media content services system.

Some of the network elements of the IPTV media system can be coupled to one or more computing devices 630, a portion of which can operate as a web server for providing web portal services over the ISP network 632 to wireline media devices 608 or wireless communication devices 616.

Communication system 600 can also provide for all or a portion of the computing devices 630 to function as a server performing automated analysis and indexing of media content, as described above with reference to FIGS. 1-5. The media processors 606 and wireless communication devices 616 can be provisioned with software functions to utilize the services of server 630.

Multiple forms of media services can be offered to media devices over landline technologies such as those described above. Additionally, media services can be offered to media devices by way of a wireless access base station 617 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 7:
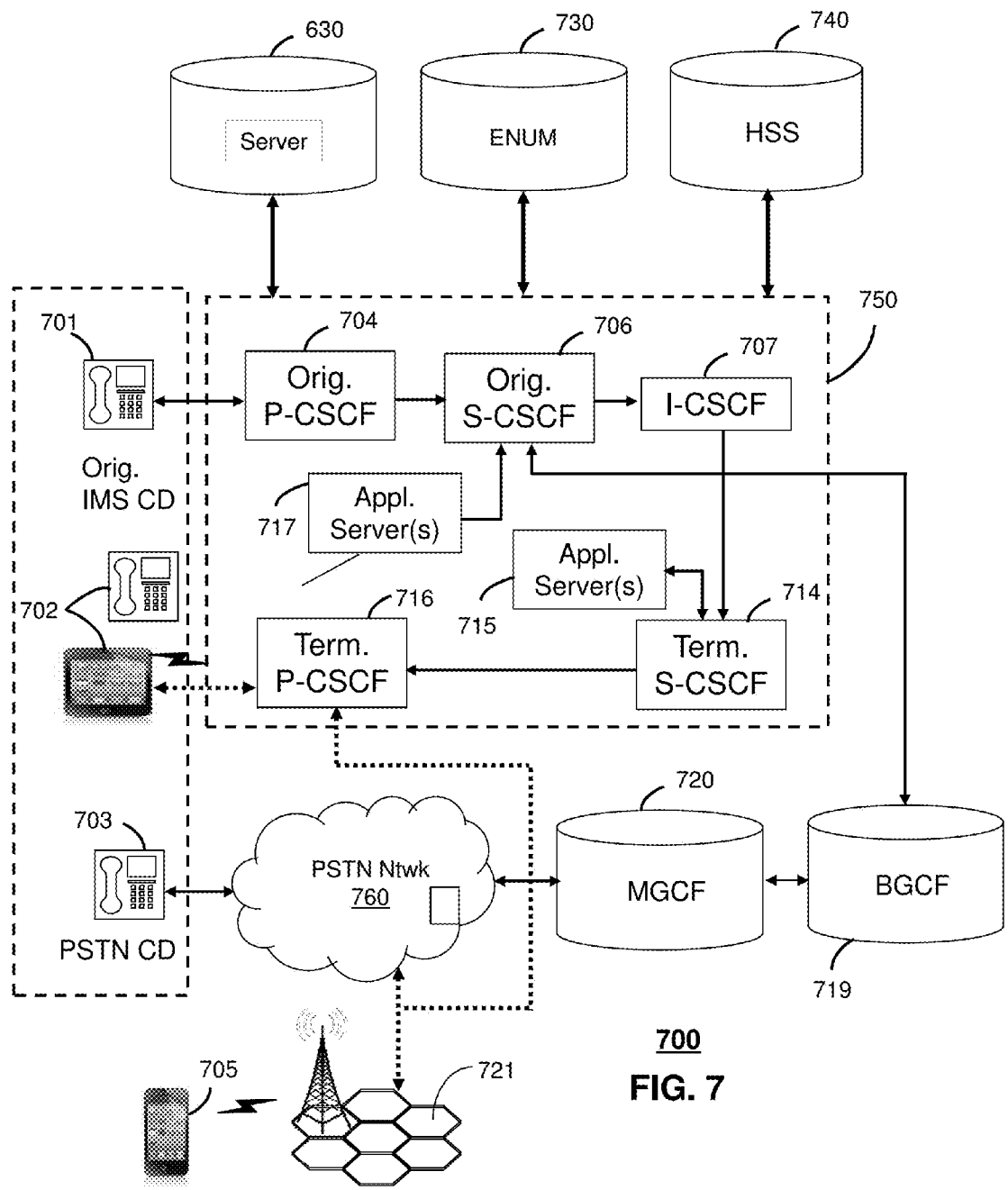

FIG. 7 depicts an illustrative embodiment of a communication system 700 employing an IP Multimedia Subsystem (IMS) network architecture to facilitate the combined services of circuit-switched and packet-switched systems. Communication system 700 can be overlaid or operably coupled with an automated system performing procedures 200, 300 and/or 500 and communication system 600 as another representative embodiment of communication system 600. In particular, communication system 700 can be configured to perform a method comprising retrieving, by a system comprising a processor, product image data from a product database, and comparing, by the system, video image data of a video frame with the product image data, wherein the video frame represents a portion of a program comprising video content. The method also comprises determining, by the system, a first product placement of a first product in the video frame based on the comparing of the video image data, and generating, by the system, a first entry in a product placement database based on the first product placement in the video frame, wherein the entry comprises an identifier of the program, an identifier of the video frame, a product descriptor descriptive of the first product, and a context descriptor descriptive of a presentation scheme used for the first product placement. The method further comprises assigning, by the system, a rating to the program with respect to the product in accordance with the first entry of the first product placement in the product placement database and other entries of other product placements in the product placement database, and generating, by the system, an advertising value associated with the program and the first product based on the rating.

Communication system 700 can comprise a Home Subscriber Server (HSS) 740, a tElephone NUmber Mapping (ENUM) server 730, and other network elements of an IMS network 750. The IMS network 750 can establish communications between IMS-compliant communication devices (CDs) 701, 702, Public Switched Telephone Network (PSTN) CDs 703, and combinations thereof by way of a Media Gateway Control Function (MGCF) 720 coupled to a PSTN network 760. The MGCF 720 need not be used when a communication session involves IMS CD to IMS CD communications. A communication session involving at least one PSTN CD may utilize the MGCF 720.

IMS CDs 701, 702 can register with the IMS network 750 by contacting a Proxy Call Session Control Function (P-CSCF) which communicates with an interrogating CSCF (I-CSCF), which in turn, communicates with a Serving CSCF (S-CSCF) to register the CDs with the HSS 740. To initiate a communication session between CDs, an originating IMS CD 701 can submit a Session Initiation Protocol (SIP INVITE) message to an originating P-CSCF 704 which communicates with a corresponding originating S-CSCF 706. The originating S-CSCF 706 can submit the SIP INVITE message to one or more application servers (ASs) 717 that can provide a variety of services to IMS subscribers.

For example, the application servers 717 can be used to perform originating call feature treatment functions on the calling party number received by the originating S-CSCF 706 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 706 can submit queries to the ENUM system 730 to translate an E.164 telephone number in the SIP INVITE message to a SIP Uniform Resource Identifier (URI) if the terminating communication device is IMS-compliant. The SIP URI can be used by an Interrogating CSCF (I-CSCF) 707 to submit a query to the HSS 740 to identify a terminating S-CSCF 714 associated with a terminating IMS CD such as reference 702. Once identified, the I-CSCF 707 can submit the SIP INVITE message to the terminating S-CSCF 714. The terminating S-CSCF 714 can then identify a terminating P-CSCF 716 associated with the terminating CD 702. The P-CSCF 716 may then signal the CD 702 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 7 may be interchangeable. It is further noted that communication system 700 can be adapted to support video conferencing. In addition, communication system 700 can be adapted to provide the IMS CDs 701, 702 with the multimedia and Internet services of communication system 600 of FIG. 6.

If the terminating communication device is instead a PSTN CD such as CD 703 (in instances where the cellular phone only supports circuit-switched voice communications), the ENUM system 730 can respond with an unsuccessful address resolution which can cause the originating S-CSCF 706 to forward the call to the MGCF 720 via a Breakout Gateway Control Function (BGCF) 719. The MGCF 720 can then initiate the call to the terminating PSTN CD over the PSTN network 760 to enable the calling and called parties to engage in voice and/or data communications.

It is further appreciated that the CDs of FIG. 7 can operate as wireline or wireless devices. For example, the CDs of FIG. 7 can be communicatively coupled to a cellular base station 721, a femtocell, a WiFi router, a Digital Enhanced Cordless Telecommunications (DECT) base unit, or another suitable wireless access unit to establish communications with the IMS network 750 of FIG. 7. The cellular access base station 721 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 7.

Cellular phones supporting LTE can support packet-switched voice and packet-switched data communications and thus may operate as IMS-compliant mobile devices. In this embodiment, the cellular base station 721 may communicate directly with the IMS network 750 as shown by the arrow connecting the cellular base station 721 and the P-CSCF 716.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 630 of FIG. 6 can be operably coupled to the second communication system 700 for purposes similar to those described above. Server 630 can perform analysis and indexing of program content and thereby provide ratings of programs to the CDs 701, 702, 703 and 705 of FIG. 7. Server 630 can be an integral part of the application server(s) 717, which can be adapted to the operations of the IMS network 750.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

FIG. 8 depicts an illustrative embodiment of a web portal 802 which can be hosted by server applications operating from the computing devices 630 of the communication system 100 illustrated in FIG. 1. Communication system 800 can be overlaid or operably coupled with communication system 600 and/or communication system 700 as another representative embodiment of an automated system performing procedures 200, 300 and/or 500, communication system 600, and/or communication system 700. The automated system can comprise a processor and a memory that stores executable instructions that, when executed by the processor, facilitate performance of operations. The operations comprise obtaining product image data and comparing video image data of a video frame with the product image data, wherein the video frame represents a portion of a program comprising video content. The operations also comprise determining a first product placement of a first product in the video frame based on the comparing of the video image data, and generating a first entry in a product placement database based on the first product placement in the video frame, wherein the entry comprises an identifier of the program, an identifier of the video frame, a product descriptor descriptive of the first product, and a context descriptor descriptive of a presentation scheme used for the first product placement. The operations further comprise assigning a rating to the program with respect to the product in accordance with the first entry of the first product placement in the product placement database and other entries of other product placements in the product placement database.

The web portal 802 can be used for managing services of communication systems 600-700. A web page of the web portal 802 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 802 can be configured, for example, to access a media processor 606 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 606. The web portal 802 can also be used for provisioning IMS services described earlier, provisioning Internet services, provisioning cellular phone services, and so on.

FIG. 9 depicts an illustrative embodiment of a communication device 900. Communication device 900 can serve in whole or in part as an illustrative embodiment of the devices depicted in FIGS. 6-7. Communication device 900 can be configured as part of a system that includes a non-transitory computer-readable storage device comprising executable instructions which, when executed by a processor of a server, cause the processor to perform operations. The operations comprise obtaining product image data and comparing image data of a media program with the product image data. The operations also comprise determining a first product placement of a first product in the media program based on the comparison. The operations further comprise generating a first entry in a product placement database based on the first product placement in the media program, wherein the entry comprises an identifier of the media program, a product descriptor descriptive of the first product, and a context descriptor descriptive of a presentation scheme used for the first product placement.

To enable these features, communication device 900 can comprise a wireline and/or wireless transceiver 902 (herein transceiver 902), a user interface (UI) 904, a power supply 914, a location receiver 916, a motion sensor 918, an orientation sensor 920, and a controller 906 for managing operations thereof. The transceiver 902 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 902 can also be adapted to support circuit-switched wireline access technologies (such as PSTN), packet-switched wireline access technologies (such as TCP/IP, VoIP, etc.), and combinations thereof.

The UI 904 can include a depressible or touch-sensitive keypad 908 with a navigation mechanism such as a roller ball, a joystick, a mouse, or a navigation disk for manipulating operations of the communication device 900. The keypad 908 can be an integral part of a housing assembly of the communication device 900 or an independent device operably coupled thereto by a tethered wireline interface (such as a USB cable) or a wireless interface supporting for example Bluetooth. The keypad 908 can represent a numeric keypad commonly used by phones, and/or a QWERTY keypad with alphanumeric keys. The UI 904 can further include a display 910 such as monochrome or color LCD (Liquid Crystal Display), OLED (Organic Light Emitting Diode) or other suitable display technology for conveying images to an end user of the communication device 900. In an embodiment where the display 910 is touch-sensitive, a portion or all of the keypad 908 can be presented by way of the display 910 with navigation features.

The display 910 can use touch screen technology to also serve as a user interface for detecting user input. As a touch screen display, the communication device 900 can be adapted to present a user interface with graphical user interface (GUI) elements that can be selected by a user with a touch of a finger. The touch screen display 910 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 910 can be an integral part of the housing assembly of the communication device 600 or an independent device communicatively coupled thereto by a tethered wireline interface (such as a cable) or a wireless interface.

The UI 904 can also include an audio system 912 that utilizes audio technology for conveying low volume audio (such as audio heard in proximity of a human ear) and high volume audio (such as speakerphone for hands free operation). The audio system 912 can further include a microphone for receiving audible signals of an end user. The audio system 912 can also be used for voice recognition applications. The UI 904 can further include an image sensor 913 such as a charged coupled device (CCD) camera for capturing still or moving images.

The power supply 914 can utilize common power management technologies such as replaceable and rechargeable batteries, supply regulation technologies, and/or charging system technologies for supplying energy to the components of the communication device 900 to facilitate long-range or short-range portable applications. Alternatively, or in combination, the charging system can utilize external power sources such as DC power supplied over a physical interface such as a USB port or other suitable tethering technologies.

The location receiver 916 can utilize location technology such as a global positioning system (GPS) receiver capable of assisted GPS for identifying a location of the communication device 900 based on signals generated by a constellation of GPS satellites, which can be used for facilitating location services such as navigation. The motion sensor 918 can utilize motion sensing technology such as an accelerometer, a gyroscope, or other suitable motion sensing technology to detect motion of the communication device 900 in three-dimensional space. The orientation sensor 920 can utilize orientation sensing technology such as a magnetometer to detect the orientation of the communication device 900 (north, south, west, and east, as well as combined orientations in degrees, minutes, or other suitable orientation metrics).

The communication device 900 can use the transceiver 902 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 906 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 9 can be used in one or more embodiments of the subject disclosure. For instance, the communication device 900 can include a reset button (not shown). The reset button can be used to reset the controller 906 of the communication device 900. In yet another embodiment, the communication device 900 can also include a factory default setting button positioned, for example, below a small hole in a housing assembly of the communication device 900 to force the communication device 900 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 900 as described herein can operate with more or less of the circuit components shown in FIG. 9. These variant embodiments can be used in one or more embodiments of the subject disclosure.

The communication device 900 can be adapted to perform the functions of the media processor 606, the media devices 608, or the portable communication devices 616 of FIG. 6, as well as the IMS CDs 701-702 and PSTN CDs 703-705 of FIG. 7. It will be appreciated that the communication device 900 can also represent other devices that can operate in communication systems 600-700 of FIGS. 6-7 such as a gaming console and a media player.

The communication device 900 shown in FIG. 9 or portions thereof can serve as a representation of one or more of the devices 430, communication system 600, and communication system 700.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 10:
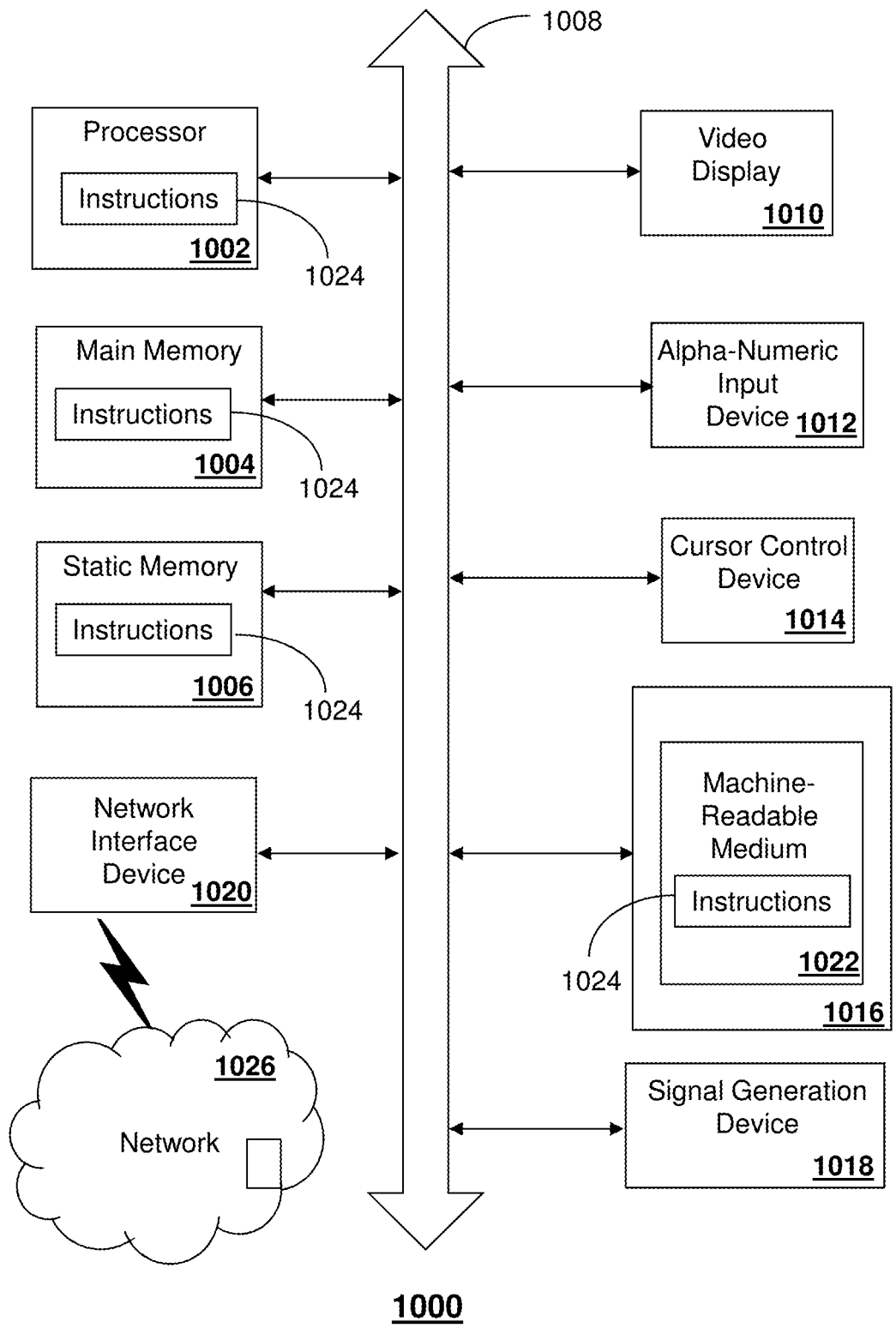
FIG. 10 is a diagrammatic representation of a machine in the form of a computer system within which a set of instructions, when executed, may cause the machine to perform any one or more of the methods described herein.

FIG. 10 depicts an exemplary diagrammatic representation of a machine in the form of a computer system 1000 within which a set of instructions, when executed, may cause the machine to perform any one or more of the methods described above. One or more instances of the machine can operate, for example, as the server 630, media processor 606, computing device 410, or any of devices 430. In some embodiments, the machine may be connected (e.g., using a network 1026) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display. The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable array. Furthermore, software implementations (e.g., software programs, instructions, etc.) can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 1000.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
retrieving, by a processing system including a processor, product image data from a product database;
comparing, by the processing system, video image data of a video frame with the product image data, wherein the video frame represents a portion of a program comprising video content;
determining, by the processing system, a first product placement of a first product in the video frame based on the comparing of the video image data;
generating, by the processing system, a first entry in a product placement database based on the first product placement in the video frame, wherein the entry comprises an identifier of the program, an identifier of the video frame, a product descriptor descriptive of the first product, a context descriptor descriptive of a presentation scheme used for the first product placement, and a measure of quality of the context of the first product placement;
assigning, by the processing system, a rating to the program with respect to the product in accordance with the first entry of the first product placement in the product placement database and other entries of other product placements in the product placement database;
generating, by the processing system, an advertising value associated with the program and the first product based on the rating; and
generating, by the processing system, a price for placement of an advertisement of the first product during an advertising time slot in the program, based on a location of the first product placement in the program,
wherein the measure of quality indicates prominence of the first product in the video frame and speech or action relating to the first product by a person shown in the video frame, wherein the person shown in the video frame does not appear in the advertisement, and wherein a favorable comment relating to the first product by the person is associated with a positive context quality and an unfavorable comment relating to the first product by the person is associated with a negative context quality.

2. The method of claim 1, further comprising:
retrieving, by the processing system, an audio identifier of the first product from the product placement database;
comparing, by the processing system, the audio identifier with an audio component of the program;
determining, by the processing system, a second product placement of the first product in the audio component based on the comparing of the audio identifier; and
generating, by the processing system, a second entry in the product placement database based on the second product placement of the first product in the audio component.

3. The method of claim 1, wherein the measure of quality has a numeric value, and wherein the measure of quality comprises a positive context quality, a neutral context quality, or a negative context quality.

4. The method of claim 1, wherein the rating is based on a number of first product placements of the first product in the program, a number of second product placements of the first product in the program, the measure of quality for the first product placements of the first product in the program, and the measure of quality for the second product placements of the first product in the program.

5. The method of claim 1, wherein the comparing is performed by processing the video image data using a plurality of video processing filters, and wherein each of the video processing filters processes the video image data with respect to a different image of the first product.

6. The method of claim 2, wherein comparing the audio identifier with the audio component of the program is performed by processing the audio component using an audio processing filter according to a spoken name of the first product.

7. The method of claim 1, further comprising generating a premium value for an advertising time slot in the program, based on proximity of the time slot to a location of the first product placement in the program.

8. The method of claim 1, wherein the system comprises a plurality of user devices functioning as a crowd-sourcing entity.

9. A device comprising:
a processing system including a processor; and
a memory that stores executable instructions that, when executed by the processing system, facilitate performance of operations, comprising:
obtaining product image data;
comparing video image data of a video frame with the product image data, wherein the video frame represents a portion of a program comprising video content;
determining a first product placement of a first product in the video frame based on the comparing of the video image data;
generating a first entry in a product placement database based on the first product placement in the video frame, wherein the entry comprises an identifier of the program, an identifier of the video frame, a product descriptor descriptive of the first product, a context descriptor descriptive of a presentation scheme used for the first product placement, and a measure of quality of the context of the first product placement;
assigning a rating to the program with respect to the product in accordance with the first entry of the first product placement in the product placement database and other entries of other product placements in the product placement database; and
generating a price for placement of an advertisement of the first product during an advertising time slot in the program, based on a location of the first product placement in the program,
wherein the measure of quality indicates prominence of the first product in the video frame and speech or action relating to the first product by a person shown in the video frame, wherein the person shown in the video frame does not appear in the advertisement, and wherein a favorable comment relating to the first product by the person is associated with a positive context quality and an unfavorable comment relating to the first product by the person is associated with a negative context quality.

10. The device of claim 9, wherein the product image data is obtained from a product database.

11. The device of claim 9, wherein the operations further comprise generating an advertising value associated with the program and the first product based on the rating.

12. The device of claim 9, wherein the operations further comprise:
retrieving an audio identifier of the first product from the product placement database;
comparing the audio identifier with an audio component of the program;
determining a second product placement of the first product in the audio component based on the comparing of the audio identifier; and
generating a second entry in the product placement database based on the second product placement of the first product in the audio component.

13. The device of claim 12, wherein the comparing the audio identifier with the audio component of the program comprises processing the audio component using an audio processing filter according to a spoken name of the first product.

14. The device of claim 9, wherein the comparing further comprises processing the video image data using a plurality of video processing filters, and wherein each of the video processing filters processes the video image data with respect to a different image of the first product.

15. The device of claim 9, wherein the operations further comprise generating a premium value for an advertising time slot in the program, based on proximity of the time slot to a location of the first product placement in the program.

16. A non-transitory computer-readable storage medium comprising executable instructions that, when executed by a processing system including a processor, facilitate performance of operations comprising:
obtaining product image data;
comparing image data of a media program with the product image data;
determining a first product placement of a first product in the media program based on the comparing;
generating a first entry in a product placement database based on the first product placement in the media program, wherein the entry comprises an identifier of the media program, a product descriptor descriptive of the first product, a context descriptor descriptive of a presentation scheme used for the first product placement, and a measure of quality of the context of the first product placement; and
generating a price for placement of an advertisement of the first product during an advertising time slot in the media program, based on a location of the first product placement in the media program,
wherein the measure of quality indicates prominence of the first product in the media program and speech or action relating to the first product by a person in the media program, wherein the person in the media program does not appear in the advertisement, and wherein a favorable comment relating to the first product by the person is associated with a positive context quality and an unfavorable comment relating to the first product by the person is associated with a negative context quality.

17. The non-transitory computer-readable storage medium of claim 16, wherein the image data comprises video image data, and wherein the operations further comprise:
obtaining an audio identifier of the first product;
comparing the audio identifier with an audio component of the media program;
determining a second product placement of the first product in the audio component based on the comparing of the audio identifier; and
generating a second entry in the product placement database based on the second product placement of the first product in the audio component.

18. The non-transitory computer-readable storage medium of claim 16, wherein the operations further comprise assigning a rating to the media program with respect to the product in accordance with the first entry of the first product placement in the product placement database and other entries of other product placements in the product placement database.

19. The non-transitory computer-readable storage medium of claim 18, wherein the operations further comprise generating an advertising value associated with the media program and the first product based on the rating.

20. The non-transitory computer-readable storage device of claim 16, wherein the operations further comprise generating a premium value for an advertising time slot in the media program, based on proximity of the time slot to a location of the first product placement in the media program.

* * * * *